March 1, 1960  J. P. FRANCIS  2,926,678
AUTOMOBILE WINDSHIELD WEATHER AWNING
Filed May 6, 1958
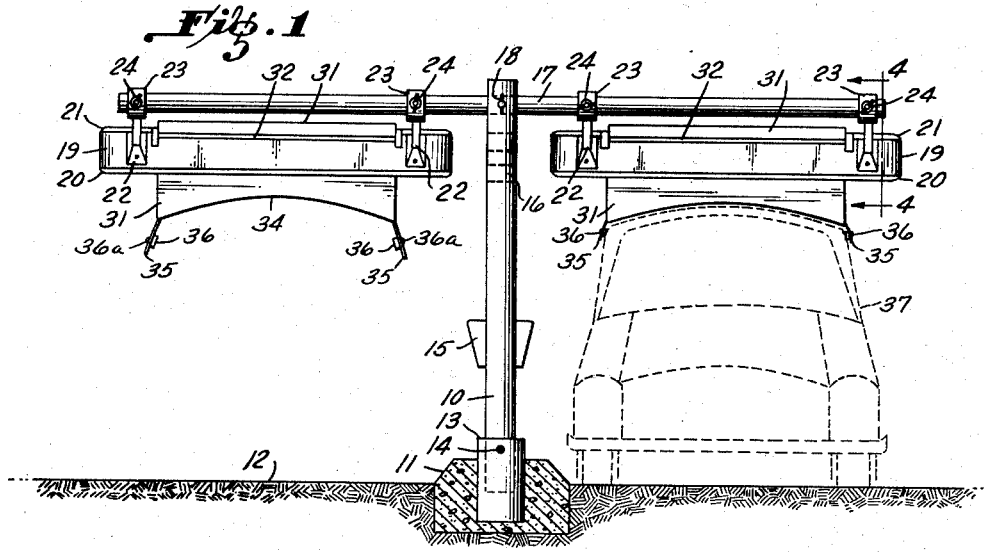
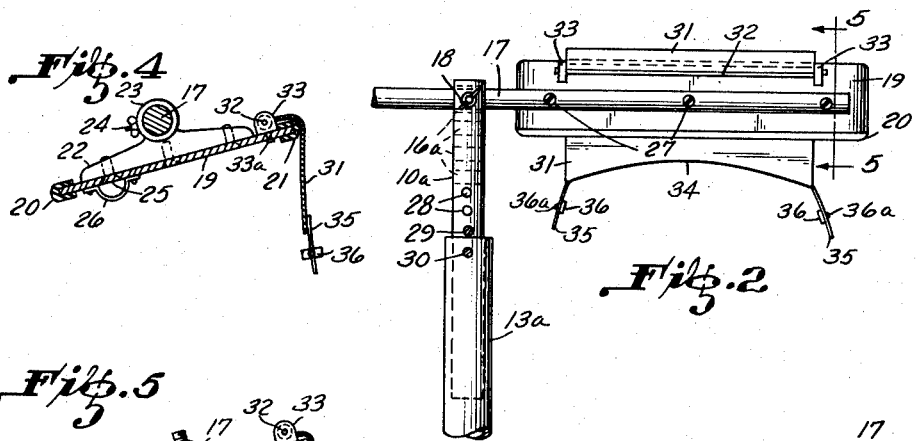
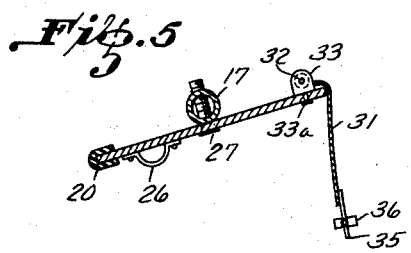
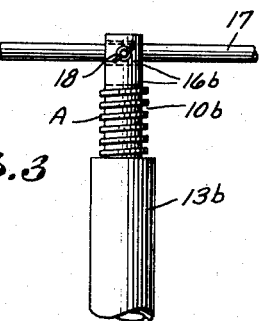
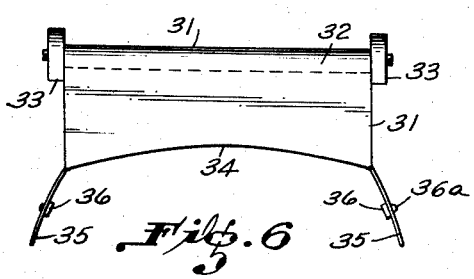
INVENTOR
John P. Francis United States Patent Office 2,926,678
Patented Mar. 1, 1960

2,926,678

AUTOMOBILE WINDSHIELD WEATHER AWNING

John P. Francis, Haverhill, Mass.

Application May 6, 1958, Serial No. 734,080

1 Claim. (Cl. 135—5)

This invention relates generally to automobile windshield weather awnings and more partcularly to an awning which is supported over the roof top and the windshield area of an automobile from a horizontally mounted supporting arm extending outwardly from a central vertically mounted supporting post, and adapted for use in a drive-in parking area such as a drive-in theatre, an object thereof being to provide a non-complicated, sturdy, safe and inexpensive awning structure for the complete weather protection of the general windshield area of an automobile in providing clear vision at all times during inclement weather conditions.

Another object of this invention is to provide an awning structure whereby the awning is adjustably movable for angular alignment and adapted to be adjusted vertically to suit any condition or interference existing or anticipated in the general parking area for the automobiles.

A further object of this invention is to provide an angularly adjustable awning having a rear flexible rain sealing curtain, vertically adjustable from the said awning, and adapted to engage the lateral contour of the roof top of any height automobile and more particularly automobiles of the below average height, in providing complete weather protection thereto from any rain, sleet or snow from descending from the forward slope of the roof top due to the angle thereof or the directional force of the descending weather precipitation.

A still further object of this invention is to provide an awning structure which is very easily assembled, adjusted, modified or dis-assembled either in part or in whole, and is adapted to provide unobstructed vision for all the other automobile occupants in the general area against any height obstruction when viewing outdoor movies or the like.

With these objects and still further objects in view, as will hereinafter more fully appear, the invention comprises certain novel constructions, combinations and arrangement of parts, hereinafter described and claimed, and illustrated in the accompanying drawings, in which:

Figure 1 is a front elevation view of the device showing the pre-adjusted awning in aligned position relative to the automobile. The left hand portion showing the device prior to the entry of an automobile thereunder.

Figure 2 is a front elevation fragmentary view of a modified awning device, showing the modified central vertical post arrangement and also the modified awning attachment to the supporting arm.

Figure 3 is a front elevation fragmentary view of another modification of the central vertical post arrangement for vertical adjustment.

Figure 4 is a cross-sectional view taken on line 4—4 of Figure 1, showing the awning arrangement and the support thereof.

Figure 5 is a cross-sectional view taken on line 5—5 of Figure 2, showing the modified awning arrangement and the support thereof; and Figure 6 is a rear elevation view of the rain sealing curtain shown suspended from the rolled portion thereof and mounted between the end supports, for attachment to the awning.

Referring now in detail to the drawings, a central vertical supporting post 10 is shown mounted within an outer cylinder 13, which is encased in the concrete anchoring means 11 anchored in the ground 12. A removable locking pin 14 extending through the cylinder 13 and post 10 is adapted to secure the supporting structure in the "in use" position. The supporting structure may therefore be removed entirely from the area for stowage purposes, or, stowed in an "out of use" position when the supporting structure is rotated and aligned in relation to the longitudinal alignment of the automobile.

A vertical supporting post with horizontal supporting arms extending therefrom, and an awning with a rain sealing curtain vertically movable only upon the adjustable movement of the awning is shown and described in my copending application, Serial No. 644,050, filed March 5, 1957, now Patent No. 2,869,562. My invention therefore is primarily concerned with the central vertical supporting post with a horizontal supporting arm extending outwardly therefrom, in the form of a T-structure, and the vertically adjustable rain sealing curtain adapted to be raised or lowered at will, independent of the position of the awning. Therefore, without any vertical alignment of the awning, rain sealing engagement and protection is provided for each automobile.

The central vertical supporting post 10, Figure 1, is provided with a series of horizontal apertures 16 for the support and the vertical height adjustment of the horizontal supporting arm 17 thereto, in addition to the axial adjustment of said arm 17, and secured in the desired alignment by thumb screw 18. The vertical height adjustment and the axial alignment of the horizontal supporting arm 17 is best performed by the management to suit the general conditions, such as, the height clearance of the viewing screen; the contour of the terrain; the area selected for the very low type or make of automobile; and, any existing or any anticipated interferences that would interfere with total and clear vision for the automobile occupants.

In Figure 2 a modified central supporting post 10a is shown supported within cylinder 13a, the post 10a being provided also with horizontal apertures 16a and additional apertures 28 for any vertical adjustment of post 10a, and secured in position by removable locking pin 29 extending through an aperture 28 and seated on the top of cylinder 13a. The removable locking pin 30 extending through cylinder 13a and post 10a prevents accidental rotation of the post 10a.

In Figure 3 there is shown another modified central supporting post 10b supported within cylinder 13b for any vertical adjustment by worm gear A, upon rotation of said post 10b. The post is also provided with horizontal apertures 16b therethrough for any vertical and axial adjustment of the supporting arm 17.

Referring back to Figure 1, the speaker baskets 15 are shown attached to post 10. Near the top of said post a thumb screw 18, also in Figures 2 and 3, is adapted to engage and secure the adjustable supporting arm 17 for the desired angular position of the awnings 19 suspended therefrom. The awning or panel 19 is shown supported, in angular alignment, from the supporting arm 17 by the longitudinal supporting brackets 22.

In Figure 1 an automobile 37 is shown in engagement with the T-shaped supporting structure comprising the central vertical supporting post 10, the horizontal supporting arm 17 and the awnings 19 suspended therefrom. The angularly aligned awnings 19 have a U-shaped rubber bead 20 on the front lateral edge thereof, in addition to a similar bead 21 on the rear lateral edge, to serve as a rain drip molding and also as a flexible cushion to prevent any damage to the roof top.

Suspended at the rear of said awning 19 is a vertically adjustable lateral rain sealing curtain 31 provided with an arcuate contour 34 at the base thereof and provided further with flexible tabs 35 at each outer end thereof. On each tab 35 there is attached by a screw 36a, or other suitable means, a magnetized metal block 36 adapted to engage the desired metal portion of the automobile. This enables the base 34 of the rain sealing curtain 31 to adjustably engage the lateral portion of the roof top in rain sealing engagement.

The rain sealing curtain 31 formed of water repellent fabric and shown suspended from the roll 32, Figure 6, is supported by the end supporting members 33, which are secured to the upper surface of the awning 19 by screws 33a, Figures 4 and 5. The rain sealing curtain 31 is adapted to be raised or lowered to the desired position by the occupant of the automobile and aligned to the roof top in either a vertical or angular position and secured in position by the magnetized blocks 36, or, by inserting each tab end 35 loosely between the window of the vehicle door when the window is in a lowered position.

Metal blocks 36 are magnetized sufficiently to hold the curtain 31 in any desired position, and yet enable the vehicle to move therefrom without causing any damage in the event that blocks 36 are not removed prior to any movement of the vehicle. Small vacuum cups (not shown) may be used in place of the blocks 36 for securing the end tabs 35. The securing tabs 35 are used primarily during heavy storms, or when wind disturbances require the use thereof to maintain the curtain 31 in rain sealing engagement.

In Figure 4, the longitudinal supporting bracket 22 is provided with a sleeve portion 23 adapted to engage the supporting arm 17 for adjustable axial alignment and is secured in position by thumb screw 24. Screws 25 secures the awning 19 to the base of the brackets 22 for support thereto.

In Figure 5, line 5—5 of Figure 2, a modified form of awning support is shown, with awning 19 secured by screws 27 to the horizontal supporting arm 17. The awning is also provided with a flexible handle 26 to align the angularity of the awning upon axial adjustment of the supporting arm 17, and which is secured in the desired angular position by thumb screw 18 engaging the arm 17.

It is quite evident that additional rain sealing curtains 31 may also be provided for the outer ends of the awning 19, which is in addition to the rear lateral rain sealing curtain, thus providing a U-shaped curtain arrangement. This feature eliminates any lowering of the supporting arm 17 or the awning 19, in providing complete weather protection for the below average lowly built automobiles.

The rolled portion 32 of the curtain 31 is supported on a spring actuated curtain roll, mounted between the end supports 33, to facilitate the vertical adjustment of said curtain. The curtain 31 therefore is maintained in the desired position of vertical adjustment.

The awning embodiment, particularly that of Figure 5, may be angularly reversed, that is angled downwardly to the rear of the automobile. Also, the awning 19, through the axial adjustment of the supporting arm 17, may be axially rotated so that the bottom surface thereof would then be the top surface. With this in mind, the U-shaped rubber bead 20 would then serve in rain sealing engagement with the lateral portion of the roof top, with adjustable curtain 31 being vertically suspended over the windshield area as desired.

Vertical adjustment of the horizontal supporting arm 17 is preferably pre-aligned. The axial adjustment of said supporting arm, which governs the degree of angularity of the awning 19, may also be pre-aligned. Individual adjustment of the rain sealing curtain 31 is performed by the occupant of the automobile, in addition to any degree of angular change of the awning shown in Figure 4.

The simplicity of the complete structure of the device; the exceedingly simple operation thereof and combined with the safety, extreme comfort, pleasure and savings, all being benefited by both the management and the occupants. Therefore, clear and complete windshield vision is provided without any on and off or continuous automobile engine noise, windshield wiper vision blur, or windshield wiper noise caused by the automobile or adjacent automobiles.

Having thus described my invention, I desire to add that changes may be made in one embodiment alone or combined in one embodiment with the other. That the mode of operation thereof may be pre-formed or individually performed, in whole or in part, to suit the management and those concerned.

Changes, therefore, in the construction and the arrangement, may be made without departing from the spirit and the scope of the invention as disclosed in the appended claim.

I claim:

An automobile windshield weather awning adapted for erection and use in a drive-in parking area such as a drive-in threatre comprising, an adjustable substantially T-shaped supporting structure having a central supporting post, said central supporting post being provided with a cross bore adapted to adjustably support a one piece horizontally mounted supporting arm extending through said cross bore and outwardly thereof in substantially equal portions and adapted to be axially adjustable relative to the longitudinal axis of said supporting arm, one or more additional vertically spaced cross bores on said central supporting post to adjustably support said supporting arm for a pre-adjusted horizontal height alignment, each outer end portion of the said supporting arm extending laterally across and just above the roof top of an automobile located in a parked postion one on each opposite side of said central supporting post, a pair of awnings, each awning being supported from the outer end portions of the said one piece horizontal supporting arm at the same level and in proximity to the roof tops and the upper windshield areas of said automobiles and adjustably movable thereto in spaced apart or free frictional engagement with the said roof tops upon said vertical or the longitudinally axial adjustment of said horizontal supporting arm in the adjustable alignment of said awnings, and a freely suspended lateral rain sealing member adjustably supported from each vertically and angularly adjustable awning and adapted to freely and frictionally engage the forward lateral portion of the roof tops in vertical rain sealing engagement between the said adjustably spaced apart awnings and the said lateral portions of the roof tops of said parked automobiles.

References Cited in the file of this patent

UNITED STATES PATENTS

| | | |
|---|---|---|
| 234,208 | Seeley | Nov. 9, 1880 |
| 2,036,033 | Fisher | Mar. 31, 1936 |
| 2,293,329 | Coburn | Aug. 18, 1942 |
| 2,508,757 | Gray | May 23, 1950 |
| 2,585,449 | Eskew | Feb. 12, 1952 |
| 2,694,231 | Bermejo | Nov. 16, 1954 |
| 2,869,562 | Francis | Jan. 20, 1959 |

FOREIGN PATENTS

| | | |
|---|---|---|
| 232,101 | Great Britain | Apr. 16, 1925 |
| 684,792 | Great Britain | Dec. 24, 1952 |
| 802,857 | France | June 12, 1936 |